(12) United States Patent
Li

(10) Patent No.: US 10,684,410 B2
(45) Date of Patent: Jun. 16, 2020

(54) LIQUID CRYSTAL DISPLAY AND BACKLIGHT MODULE THEREOF CONTAINING FUNCTIONAL MODULE AND COMPENSATION LIGHT SOURCE

(71) Applicant: Wuhan China Star Optoelectronics Technology Co., Ltd., Wuhan, Hubei (CN)

(72) Inventor: Xiaoling Li, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/752,739

(22) PCT Filed: Jan. 19, 2018

(86) PCT No.: PCT/CN2018/073506
§ 371 (c)(1),
(2) Date: Dec. 3, 2018

(87) PCT Pub. No.: WO2019/127762
PCT Pub. Date: Jul. 4, 2019

(65) Prior Publication Data
US 2019/0383996 A1    Dec. 19, 2019

(30) Foreign Application Priority Data

Dec. 28, 2017  (CN) .......................... 2017 1 1467193

(51) Int. Cl.
*F21V 8/00*         (2006.01)
*G02F 1/1333*       (2006.01)
*G02F 1/13357*      (2006.01)

(52) U.S. Cl.
CPC .......... *G02B 6/0091* (2013.01); *G02B 6/0068* (2013.01); *G02F 1/13338* (2013.01);
(Continued)

(58) Field of Classification Search
CPC .. G02B 6/0011; G02B 6/0068; G02B 6/0091; G02F 1/13338; G02F 1/133308; G02F 1/133615; G06K 9/00013
See application file for complete search history.

(56) References Cited

U.S. PATENT DOCUMENTS 5,177,802 A *  1/1993  Fujimoto ............. A61B 5/1172
                                                    356/71
7,872,705 B2 *  1/2011  Medendorp, Jr. ..........................
                                                 G02F 1/133615
                                                    349/62
(Continued)

FOREIGN PATENT DOCUMENTS

CN        101840089 A     9/2010
CN        102121670 A     7/2011
(Continued)

*Primary Examiner* — Andrew J Coughlin
*Assistant Examiner* — Michael Chiang
(74) *Attorney, Agent, or Firm* — Hemisphere Law, PLLC; Zhigang Ma

(57) ABSTRACT

A liquid crystal display and a backlight module thereof are provided. The backlight module includes a backlight source and a light guide plate. The backlight source is disposed at a side surface of the light guide plate. The light guide plate has an accommodation section for accommodating a functional module. The backlight module includes a compensation light source that is disposed on the light guide plate. The accommodation section is located between the backlight source and the compensation light source. The backlight module includes a compensation light source, and the backlight source and the compensation light source are located at two opposite sides of the accommodation section. The (Continued)

compensation light source may compensate for the illumination light in the light guide plate blocked by the functional module, so as to solve the non-uniform display problem of blocking the illumination light from the backlight source by the functional module.

6 Claims, 5 Drawing Sheets

(52) U.S. Cl.
CPC .. *G02F 1/133308* (2013.01); *G02F 1/133615* (2013.01); *G02F 2001/133331* (2013.01)

(56) References Cited

U.S. PATENT DOCUMENTS

| | | | | |
|---|---|---|---|---|
| 8,534,894 | B2* | 9/2013 | Lin | G02B 6/0036 |
| | | | | 362/606 |
| 10,267,976 | B1* | 4/2019 | Zheng | G02B 6/0045 |
| 2010/0033653 | A1* | 2/2010 | Kim | G02B 6/0021 |
| | | | | 349/65 |
| 2011/0001693 | A1* | 1/2011 | Kim | G02B 6/0068 |
| | | | | 345/102 |
| 2011/0194308 | A1 | 8/2011 | Lin | |
| 2012/0014128 | A1* | 1/2012 | Lin | G02B 6/0021 |
| | | | | 362/580 |
| 2015/0308639 | A1* | 10/2015 | Keranen | G02B 6/0065 |
| | | | | 362/235 |
| 2016/0161664 | A1* | 6/2016 | Ishida | G02B 6/0053 |
| | | | | 359/230 |
| 2018/0005003 | A1* | 1/2018 | Ryu | G06F 3/0421 |
| 2018/0149795 | A1* | 5/2018 | Lee | G02B 6/0028 |
| 2019/0072822 | A1* | 3/2019 | Yasunaga | G02B 6/0055 |
| 2019/0383995 | A1* | 12/2019 | Terazawa | G02B 6/0055 |

FOREIGN PATENT DOCUMENTS

| | | |
|---|---|---|
| CN | 103912847 | 7/2014 |
| CN | 107784989 A | 3/2018 |
| KR | 10-2017-0047980 A | 5/2017 |
| WO | 2017/061312 A1 | 4/2017 |

* cited by examiner

LIQUID CRYSTAL DISPLAY AND BACKLIGHT MODULE THEREOF CONTAINING FUNCTIONAL MODULE AND COMPENSATION LIGHT SOURCE

RELATED APPLICATIONS

The present application is a National Phase of International Application Number PCT/CN20181073506, filed Jan. 19, 2018, and claims the priority of China Application No. 201711467193.1, filed Dec. 28, 2017.

FIELD OF THE DISCLOSURE

The present invention relates to a liquid crystal display technology field, and more particularly, to a liquid crystal display (LCD) and a backlight module thereof.

BACKGROUND

Currently, liquid crystal display devices have been widely used in various electronic products to serve as display components of electronic devices. Since liquid crystal cannot emit light by itself, a backlight module is needed to provide a light source for the liquid crystal display device. Therefore, the backlight module is an essential component in the liquid crystal display device. A common backlight module includes components mainly of a reflective sheet, a light guide plate, an optical film assembly and a backlight source.

With the advancement of science technologies, a technology of integrating functional modules and a touch function comes into being. Such functional modules include a fingerprint module, a sensing module, etc. Taking a fingerprint module for example, the invisible fingerprint sensor (IFS) technology is to adhere a fingerprint recognition module directly below a touch screen glass panel to achieve an integrated appearance design of a front a front screen panel without forming any through hole at the front surface or the back surface of a mobile phone, thereby not only having a touch function but also achieving waterproof and dustproof effects. In comparison to the conventional fingerprint recognition technology, in the IFS technology, the fingerprint sensor senses fingerprint information directly through the glass cover and the display screen. On this basis, a method of forming a through hole the positions of the light guide plate, the reflective sheet, the optical film assembly of the backlight module corresponding to the fingerprint sensor is proposed for transmission of fingerprint information. However, in such backlight module, the functional module will block the illumination light that is emitted by the backlight source, which results in a darker area at the back surface of the light guide plate and thereby causes the liquid crystal display device to display non-uniform images.

SUMMARY

In order to solve the deficiencies of the prior art, the present invention provides an LCD display and a backlight module thereof which can solve the non-uniform display problem resulted from blocking illumination light of the backlight source by the functional module.

According to a specific technical solution proposed in the present invention, a backlight module is provided, which includes a backlight source and a light guide plate. The backlight source is disposed at a side surface of the light guide, the light guide plate has an accommodation section for accommodating a functional module, the backlight module further includes a compensation light source that is disposed on the light guide plate, and the accommodation section is located between the backlight source and the compensation light source.

In one embodiment, the compensation light source includes a flexible circuit board and one or more light emitting diode (LED) lamps that are disposed on the flexible circuit board. The light guide plate has a mounting section for accommodating the one or more LED lamps, and the flexible circuit board leans against a bottom surface of the light guide plate.

In one embodiment, a side of the flexible circuit board toward the accommodation section coincides with an edge of the accommodation section.

In one embodiment, the accommodation section is located at an end of the light guide plate near the backlight source, the accommodation section is a through hole, the mounting section is a recess, and the mounting section is located at the edge of the accommodation section and connects with the accommodation section.

In one embodiment, the flexible circuit board has a plate shape, the quantity of the one or more LED lamps is one, and the side of the flexible circuit board toward the accommodation section has an arc shape.

In one embodiment, the flexible circuit board has a ring shape, the quantity of the one or more LED lamps is more than one, and the LED lamps are disposed in an arc arrangement along an edge of the flexible circuit board.

In one embodiment, the LED lamps have a uniform pitch.

In one embodiment, the backlight module further includes a reflecting sheet and an optical film assembly, in which the reflecting sheet is located at a bottom of the light guide plate, and the optical film assembly is disposed at a top of the light guide plate.

The present invention further provides an LCD which includes a functional module and a backlight module that includes a backlight source and a light guide plate, in which the backlight source is disposed at one side surface of the light guide plate, and the light guide plate has an accommodation section that is near and end of the backlight source. The functional module is accommodated in the accommodation section, the backlight module further includes a compensation light source that is disposed on the light guide plate, and the accommodation section is located between the backlight source and the compensation light source.

In one embodiment, the compensation light source includes a flexible circuit board and an LED lamp that is disposed on the flexible circuit board. The light guide plate has a mounting section for accommodating the LED lamp, the flexible circuit board leans against a bottom surface of the light guide plate, the functional module includes a fingerprint module and a protective cover, the fingerprint module is accommodated in the accommodation section, and the protective cover leans against a bottom surface of the flexible circuit board.

The backlight module according to the embodiments of the present invention includes a compensation light source, and the backlight source and the compensation light source are at two opposite sides of the accommodation section. The compensation light source may compensate for the illumination light in the light guide plate blocked by the functional module, so as to solve the non-uniform display problem of blocking the illumination light from the backlight source by the functional module and thereby improves the display quality of the LCD.

DETAILED DESCRIPTION OF PREFERRED EMBODIMENTS

Figure 1:
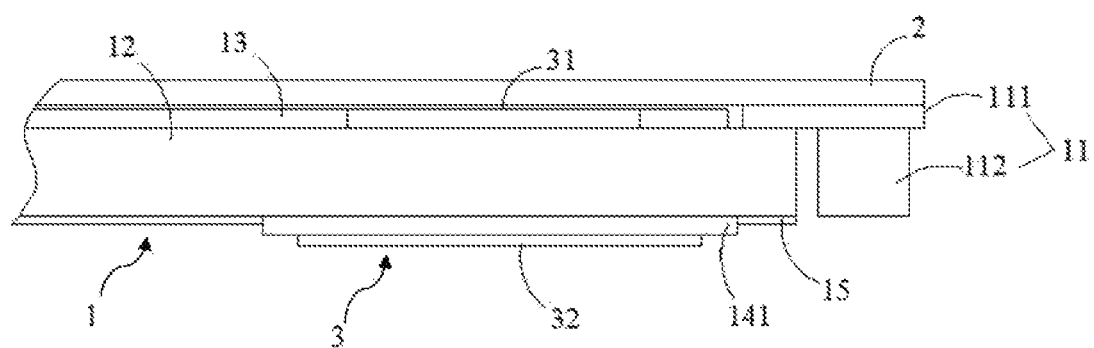
FIG. 1 is a schematic structure diagram of an LCD.
Figure 2:
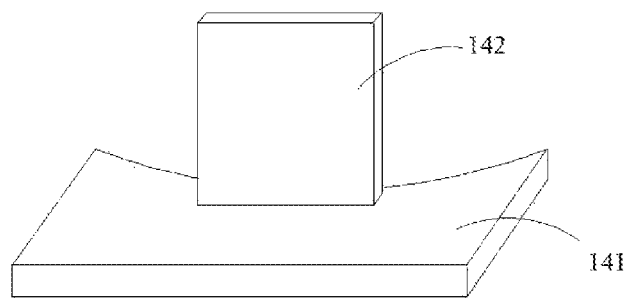
FIG. 2 is a schematic structure diagram of a compensation light source.
Figure 3:
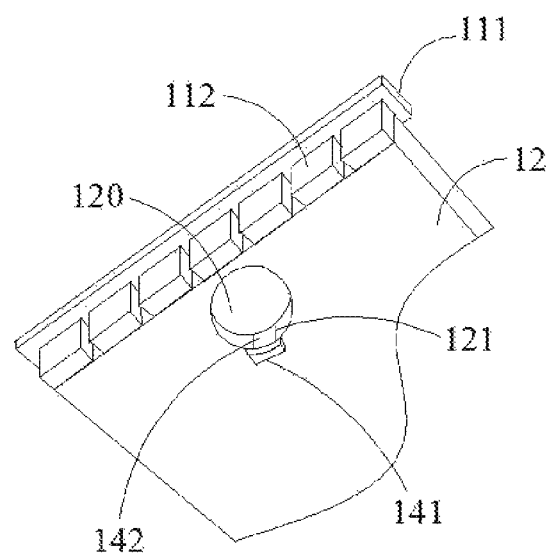
FIG. 3 is a schematic structure diagram of a backlight source, a light guide plate and a compensation light source after being assembled.
Figure 4:
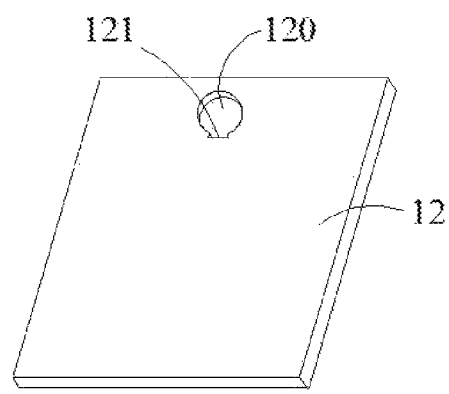
FIG. 4 is a schematic structure diagram of a light guide plate.

Embodiments of the present disclosure will be described in detail below by referring to the accompany drawings. However, the present disclosure can be embodied in many different forms, and should not be construed as being limited to the specific embodiments set forth herein. Rather, these embodiments are provided for explaining the principle and actual application of the present disclosure, thus other skilled in the art can understand various embodiments and various amendments which are suitable for specific intended applications of the present disclosure. In the drawings, the same reference numerals are used to indicate the same elements.

Referring to FIGS. 1-4, an LCD according to an embodiment includes a backlight module 1 and a display module 2, in which the backlight module 1 is used to provide a light source to the display module 2. The backlight module 1 includes a backlight source 11 and a light guide plate 12, the backlight source 11 is disposed at one side of the light guide plate 12, the light guide plate 12 has an accommodation section 120 for accommodating a functional module 3, the backlight module 1 further includes a compensation light source 14 that is disposed on the light guide plate 12, and the accommodation section 120 is located between the backlight source 11 and the compensation light source 14.

The backlight module 1 according to the embodiment is a side-edge backlight module, in which the backlight source 11 is disposed opposite to a light-incoming surface of the light guide plate 12. Illumination light emitted by the backlight source 11 enters into the light guide plate 12 through the light-incoming surface and exits from a light-emitting surface of the light guide plate 12 after several reflections in the light guide plate 12. Here, after the functional module 3 is mounted in the accommodation section 120, the surface of the accommodation section 120 toward the backlight source 11 is defined as a front surface of the functional module 3, and the surface of the accommodation section 120 far away from the backlight source 11 is defined as a back surface of the functional module 3. By mounting the compensation light source 14 at the region to which the back surface of the functional module 3 corresponds, the non-uniform display problem of blocking the illumination light from the backlight source 11 by the functional module 3 can be prevented.

The functional module 3 according to the embodiment may be a fingerprint module, a sensing module or another functional module that has a function other than a backlight function, in which the sensing module includes a human face recognition sensor, a thermal sensor, an optical sensor, etc. It is apparent that the light guide plate 12 according to the embodiment may have plural accommodation sections 120 for accommodating various functional modules 3 each corresponding one compensation light source 14, and the illumination light from the backlight source 11 may be compensated respectively by the plural compensation light sources 14.

The accommodation section 120 according to the embodiment is located at an end of the light guide plate 12 near to the backlight source 11. It is apparent that the accommodation section 120 may be disposed at any position of the light guide plate 12 according to a user's habits on different functional modules. For example, in a case where the functional module 3 is a fingerprint module, when a user operates by a signal hand, in order to allow a finger to touch the fingerprint module, the accommodation section 120 corresponding to the fingerprint module is disposed at an end of the light guide plate 12 near the backlight source 11. For a further example, in a case where the functional module 3 is a human face recognition sensor, the accommodation section 120 may be disposed at a position of the light guide plate 12 corresponding to the center of the overall display interface for capturing a human face more easily.

In the following detailed description, the functional module 3 is exemplified by a fingerprint module for the backlight module according to the embodiment, but the invention is not limited thereto.

In the embodiment, the backlight source 11 includes a printed circuit board (PCB) 111 and plural LED lamps 112, in which the LED lamps 112 are disposed on the PCB 111 and are arranged along straight lines respectively parallel to the light-emitting surface and the light-incoming surface of the light guide plate 12, and the PCB 111 is located at the top of the light guide plate 12, i.e. over the light-emitting surface of the light guide plate 12.

The compensation light source 14 includes a flexible circuit board 141 and LED lamps 142 that are disposed on the flexible circuit board 141. The light guide plate 12 has a mounting section 121 for accommodating the LED lamps 142, and the flexible circuit board 141 leans against the bottom surface of the light guide plate 12. Preferably, the LED lamps 142 are disposed opposite to the LED lamps 112 of the backlight source 11 blocked by the fingerprint module 3, and therefore the blocked LED lamps 112 can be compensated.

The accommodation section 120 is located at the center of the light guide plate 12, the distance between the accommodation section 120 and the light-incoming surface of the light guide plate 12 may be configured according to actual needs, and the distance between the mounting section 121 and the accommodation section 120 is as small as possible. As such, the light illuminated by the LED lamps 142 of the compensation light source 14 can be better propagated in the light guide plate 12, such that the illumination light emitted from the light-emitting surface of the light guide plate 12 can be more uniform.

The side of the flexible circuit board 141 toward the accommodation section 120 coincides with an edge of the accommodation section 120. For example, if the shape of the accommodation section 120 is square, the side of the flexible circuit board 141 toward the accommodation section 120 is a straight line; if the shape of the accommodation section 120 is circle, the side of the flexible circuit board 141 toward the accommodation section 120 is an arc line of which the radian is identical to that of the circle.

The accommodation section 120 according to the embodiment is a through hole that penetrates through the light guide plate 12, the mounting section 121 is a recess, the mounting section 121 is located at the edge of the accommodation section 120 and connects with the accommodation section 120, the flexible circuit board 141 has a plate shape, and the side of the flexible circuit board 141 toward the accommodation section 120 has an arc shape. As such, in the mounting process, the LED lamps 142 are latched in the mounting section 121, and the arc edge of the flexible circuit board 141 corresponds to the edge of the accommodation section 120, such that the fingerprint module 3 can be mounted without being affected by the portion of the flexible circuit board 141 located in the accommodation section 120. In a case where the flexible circuit board 141 has a plate shape, the quantity of the LED lamps 142 is one, and the LED lamp 142 is opposite to the LED lamps 112 of the backlight source 11 blocked by the fingerprint module.

Figure 5:
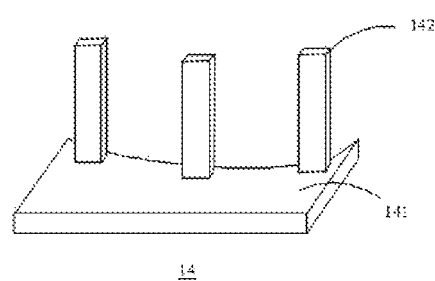
FIG. 5 is a schematic structure diagram of a compensation light source.
Figure 6:
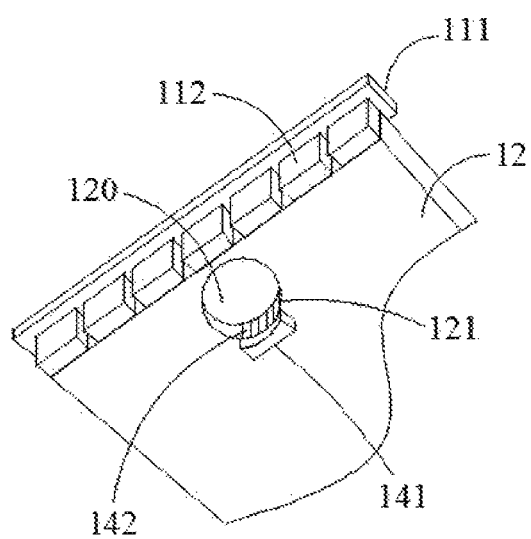
FIG. 6 is a schematic structure diagram of a backlight source, a light guide plate and a compensation light source after being assembled.
Figure 7:
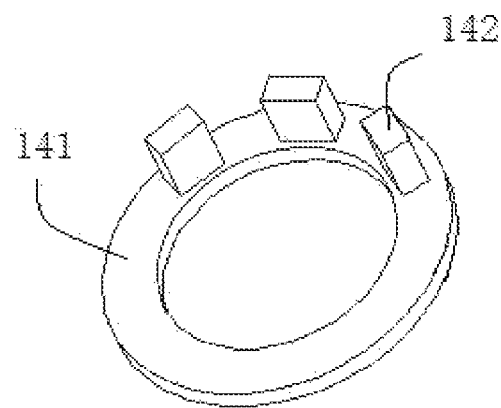
FIG. 7 is another schematic structure diagram of a compensation light source.
Figure 8:
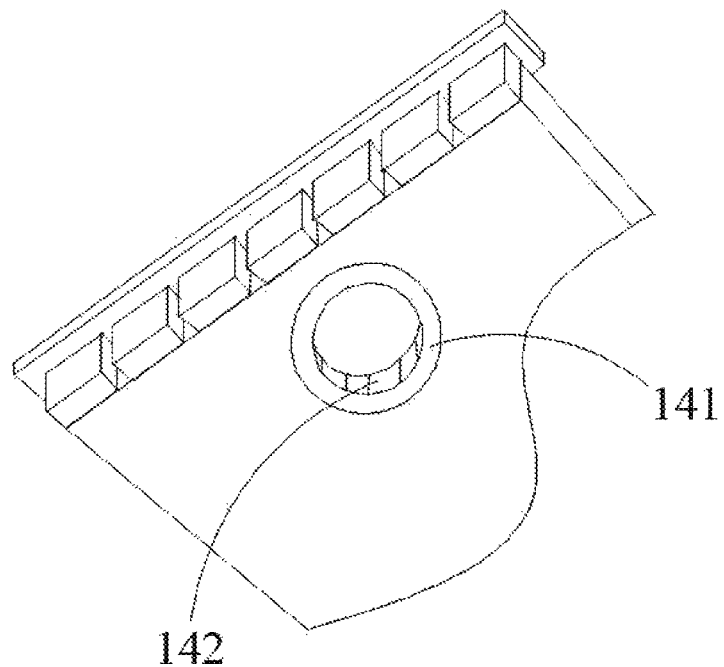
FIG. 8 is a schematic structure diagram of a backlight source, a light guide plate and a compensation light source after being assembled.
Figure 9:
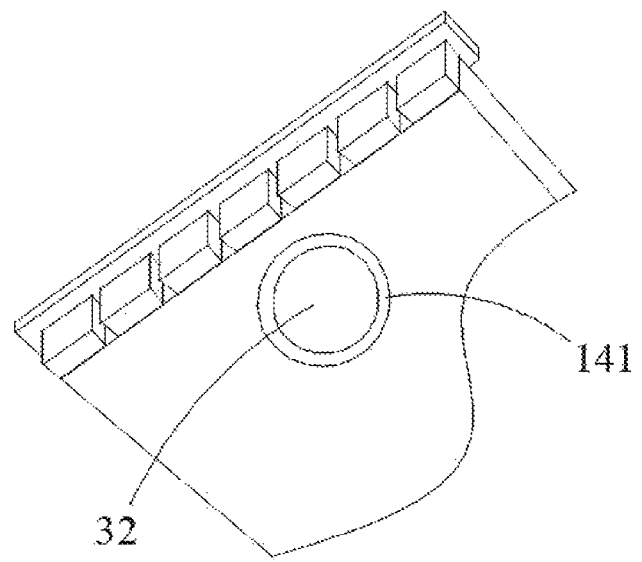
FIG. 9 is a back view of a functional module, a backlight source, a light guide plate and a compensation light source after being assembled.
Figure 10:
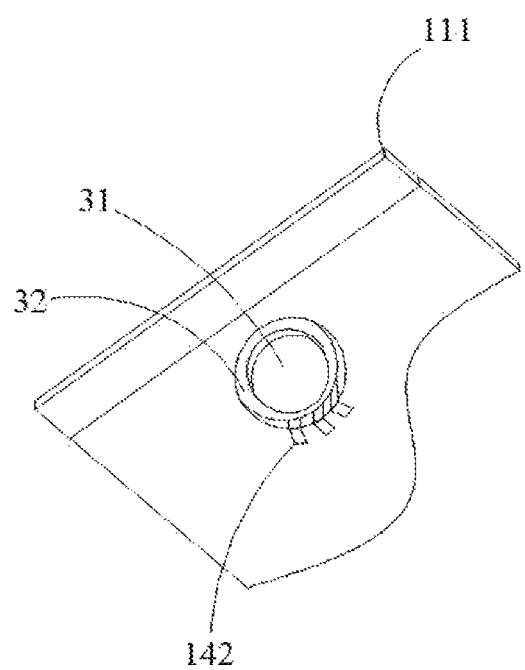
FIG. 10 is a front view of a functional module, a backlight source, a light guide plate and a compensation light source after being assembled.

Referring to FIGS. 5 and 6, in order to better compensate the illumination light emitted by the backlight source 11, the quantity of the LED lamps 142 may be more than one, the LED lamps 142 are disposed in an arc arrangement along the edge of the flexible circuit board 141 and have a uniform pitch.

Referring to FIGS. 7-10, the flexible circuit board 141 according to embodiments may alternative have a ring shape, the contact area of the ring-shaped flexible circuit board 141 and the light guide plate 12 is larger, and in the actual assembly process, the flexible circuit board 141 adheres to the light guide plate 12 by using glue, such that the contact area is larger and thus the adhesion of the flexible circuit board 141 is stronger. The flexible circuit board 141 has a ring shape, the LED lamps 142 can be disposed more, and the LED lamps 142 are disposed in an arc arrangement along the edge of the flexible circuit board 141 and have a uniform pitch, such that the illumination light emitted from the compensation light source 14 can be more uniform.

The backlight module 1 further includes a reflecting sheet 15 and an optical film assembly 13, in which the reflective sheet 15 is located at the bottom of the light guide plate 12, and the optical film assembly 13 is disposed at the top of the light guide plate 12 and opposite to the light-emitting surface of the light guide plate 12. The reflective sheet 15 is used to reflect the illumination light emitted to the bottom of the light guide plate 12 back to the light guide plate 12.

Referring to FIGS. 1, 9 and 10 again, the fingerprint module 3 according to embodiments includes a fingerprint device 31 and a protective cover32, in which the fingerprint device 31 is accommodated in the accommodation section 120, and the protective cover 32 leans against the bottom of the flexible circuit board 141. The diameter of the protective cover 32 is larger than the inner diameter of the flexible circuit board 141. As such, the edge of the protective cover 32 leans against the surface of the flexible circuit board 141, and in the mounting process, the portion of the protective cover 32 covering the surface of the flexible circuit board 141 adheres to the flexible circuit board 141 to be able to fix the fingerprint module 3.

The diameter of the fingerprint device 31 is smaller than that of the accommodation section 120. As such, when accommodated in the accommodation section 120, the fingerprint device 31 does not contact the LED lamps 142 that are located at the edge of the accommodation section 120, so as to prevent the performance of the fingerprint device 31 from being affected by a large amount of heat generated by the working of the LED lamps 142 and propagated to the fingerprint device 31.

The optical film assembly and the reflective sheet 15 according to embodiments may also have through holes corresponding to the fingerprint module 3 to accommodate the fingerprint module 3.

The above description is merely the specific embodiment of the present invention, and it is noted that, for those ordinary technical personnel in the art, it also can be improved and modified under the circumstance of without disobeying the present application principle, and these improvements and modifications are also considered in the scope of the present application.

What is claimed is:

1. A backlight module comprising a backlight source, a light guide plate and a compensation light source, wherein the backlight source is disposed at a side surface of the light guide plate, the light guide plate has a through hole for accommodating a functional module, and the through hole is located at an end of the light guide plate near the backlight source;

wherein the backlight module further comprises a compensation light source that is disposed on the light guide plate, the compensation light source has a flexible circuit board and one or more light emitting diode (LED) lamps that are vertically disposed on the flexible circuit board, and the through hole is located between the backlight source and the compensation light source;

wherein the light guide plate further comprises a recess for accommodating the one or more LED lamps, the recess is located at an edge of the through hole and connects with the through hole, the flexible circuit board leans against a bottom surface of the light guide plate, and a side of the flexible circuit board toward the through hole coincides with the edge of the through hole.

2. The backlight module according to claim 1, wherein the flexible circuit board has a plate shape, the quantity of the one or more LED lamps is one, and the side of the flexible circuit board toward the through hole has an arc shape.

3. The backlight module according to claim 1, wherein the flexible circuit board has a ring shape, the quantity of the one or more LED lamps is more than one, and the LED lamps are disposed in an arc arrangement along an edge of the flexible circuit board.

4. The backlight module according to claim 3, wherein the LED lamps have a uniform pitch.

5. The backlight module according to claim 1, further comprising a reflecting sheet and an optical film assembly, the reflecting sheet located at a bottom of the light guide plate, and the optical film assembly disposed at a top of the light guide plate.

6. A liquid crystal display (LCD) comprising a functional module and a backlight module, the backlight module comprising a backlight source and a light guide plate, the backlight source disposed at one side surface of the light guide plate, the light guide plate having an accommodation section near the backlight source, the functional module accommodated in the accommodation section, the backlight module further comprising a compensation light source that is disposed on the light guide plate, and the accommodation section located between the backlight source and the compensation light source;

wherein the compensation light source comprises a flexible circuit board and an LED lamp that is disposed on the flexible circuit board, the light guide plate has a mounting section for accommodating the LED lamp, the flexible circuit board leans against a bottom surface of the light guide plate, the functional module comprises a fingerprint module and a protective cover, the fingerprint module is accommodated in the accommodation section, and the protective cover leans against a bottom surface of the flexible circuit board.

\* \* \* \* \*